United States Patent
Greiner et al.

(10) Patent No.: US 10,180,568 B2
(45) Date of Patent: Jan. 15, 2019

(54) PROCESS FOR CORRECTING ABERRATION DEFECTS WITHIN AN OPTICAL DEVICE FOR OBSERVING A FIELD THROUGH A WINDOW

(75) Inventors: Bernard Greiner, Orsay (FR); Sylvain Berthier, Montcourt-Fromonville (FR)

(73) Assignee: MBDA FRANCE, Paris (FR)

( * ) Notice: Subject to any disclaimer, the term of this patent is extended or adjusted under 35 U.S.C. 154(b) by 577 days.

(21) Appl. No.: 13/640,682

(22) PCT Filed: Apr. 27, 2011

(86) PCT No.: PCT/FR2011/000257
§ 371 (c)(1),
(2), (4) Date: Oct. 11, 2012

(87) PCT Pub. No.: WO2011/138518
PCT Pub. Date: Nov. 10, 2011

(65) Prior Publication Data
US 2013/0027783 A1   Jan. 31, 2013

(30) Foreign Application Priority Data
May 4, 2010 (FR) ........................................ 10 01914

(51) Int. Cl.
*G02B 27/00* (2006.01)
*F41G 7/22* (2006.01)
*G02B 26/08* (2006.01)

(52) U.S. Cl.
CPC ....... *G02B 27/0025* (2013.01); *F41G 7/2253* (2013.01); *F41G 7/2293* (2013.01); *G02B 26/0891* (2013.01)

(58) Field of Classification Search
CPC ........ F41G 3/22; F41G 7/2293; F41G 7/2253; F41G 7/2213; G02B 26/0883;
(Continued)

(56) References Cited

U.S. PATENT DOCUMENTS 4,404,592 A * 9/1983 Pepin .................... F41G 7/2213
244/3.16
4,705,343 A * 11/1987 Simons ................... G02B 13/14
244/3.1
(Continued)

FOREIGN PATENT DOCUMENTS

DE    10135222 A1 * 2/2003  ........... F41G 7/2213
DE    10135222 A1 * 2/2003  ........... F41G 7/2213
(Continued)

OTHER PUBLICATIONS

English machine translation of EP 1203978.*
(Continued)

*Primary Examiner* — Nicholas R. Pasko
(74) *Attorney, Agent, or Firm* — Klein, O'Neill & Singh, LLP

(57) ABSTRACT

The window substantially has the shape of a dome. The optical observation device includes means of optical conjugation of the observed field with a plane of observation and means for relatively orienting the observation plane with respect to said field. Optical correction means are provided so as to correct aberration defects. According to the device, system, and method, said optical correction means are arranged between said windows and said relative orientation means in such a way that said optical correction means form an optical system with said window, which is at least substantially afocal.

19 Claims, 2 Drawing Sheets

(58) Field of Classification Search
CPC .. G02B 26/08; G02B 26/0891; G02B 27/644;
G02B 27/0025
USPC .......... 359/226.2, 648–651, 896, 900, 211.2,
359/211.3, 663, 668, 744; 244/3.1, 3.15,
244/3.16, 3.17
See application file for complete search history.

(56) References Cited

U.S. PATENT DOCUMENTS

| | | | | | |
|---|---|---|---|---|---|
| 4,989,928 | A * | 2/1991 | Fantozzi | ................ | G02B 13/14 359/356 |
| 5,526,181 | A * | 6/1996 | Kunick | .............. | G02B 27/0025 244/3.16 |
| 6,028,712 | A * | 2/2000 | McKenney | ........... | F41G 7/2213 359/642 |
| 6,310,730 | B1 * | 10/2001 | Knapp | ................. | F41G 7/2213 244/3.17 |
| 6,313,951 | B1 * | 11/2001 | Manhart | ............... | F41G 7/2213 244/3.17 |
| 6,343,767 | B1 * | 2/2002 | Sparrold | ............... | F41G 7/2253 244/3.15 |
| 6,356,396 | B1 * | 3/2002 | Chen | ....................... | G02B 3/06 244/3.17 |
| 6,462,889 | B1 * | 10/2002 | Jackson | ................. | G02B 5/003 244/3.17 |
| 6,871,817 | B1 | 3/2005 | Knapp | | |
| 7,042,654 | B2 * | 5/2006 | Knapp | .................. | G02B 13/06 359/642 |
| 7,423,245 | B2 * | 9/2008 | Baumgart | .............. | F42B 10/46 244/117 R |
| 7,813,644 | B2 * | 10/2010 | Chen | ..................... | G01S 7/4812 244/3.1 |
| 7,898,712 | B2 * | 3/2011 | Adams | ................. | G02B 7/1805 359/209.1 |
| 8,497,457 | B2 * | 7/2013 | Brunton | ................ | F41G 7/2213 244/3.1 |
| 2005/0249502 | A1 * | 11/2005 | Chen | ..................... | G01S 7/4812 398/118 |
| 2009/0256949 | A1 * | 10/2009 | Rana | ....................... | G02B 23/02 348/340 |
| 2012/0312913 | A1 * | 12/2012 | Eckhardt | ............... | F41G 7/2213 244/3.16 |

FOREIGN PATENT DOCUMENTS

| | | | | |
|---|---|---|---|---|
| EP | 1 203 978 | A1 | 5/2002 | |
| EP | 1203978 | A1 * | 5/2002 | ........... F41G 7/2213 |
| EP | 1203978 | A1 * | 5/2002 | ........... F41G 7/2213 |
| FR | 2 877 719 | A1 | 5/2006 | |

OTHER PUBLICATIONS

English Machine Translation of EP 1203978 (Year: 2002).*
International Search Report completed Jul. 6, 2011 and dated Jul. 26, 2011 from corresponding International Application No. PCT/FR2011/000257 filed Apr. 27, 2011 (3 pages).
Written Opinion completed Jul. 6, 2011 and dated Jul. 26, 2011 from corresponding International Application No. PCT/FR2011/000257 filed Apr. 27, 2011 (11 pages).
Schleijpen et al., "Imaging Seeker Surrogate for IRCM Evaluation," Proc. of SPIE, 2006, vol. 6397, 63970E, Technologies for Optical Countermeasures III, Bellingham, WA, pp. 1-12 (12 pages).

* cited by examiner

PROCESS FOR CORRECTING ABERRATION DEFECTS WITHIN AN OPTICAL DEVICE FOR OBSERVING A FIELD THROUGH A WINDOW

CROSS-REFERENCE TO RELATED APPLICATIONS

This is a national phase application under 35 U.S.C. § 371 of PCT Application No. PCT/FR2011/000257, filed Apr. 27, 2011, which claims the benefit of French application No. 1001914, filed May 4, 2010, the contents of each of which are expressly incorporated herein by reference.

FIELD OF ART

The present disclosure relates to a process for correcting aberration defects within a viewing optical device, with a mobile orientation, to observe a field through a window, the shape of which is substantially like a dome, as well as an optical viewing device with a mobile orientation, the aberration defects of which are thus corrected.

Although not exclusively, the optical correction process and the optical viewing device according to aspects of the invention are intended to be applied to the self-leading guidance of a missile, for which it is of importance that the path is corrected in real time relative to the position of the target with respect to the viewing field of said device. Other applications are also to be envisaged, in particular the equipment of a terrestrial vehicle or a reconnaissance airplane, for example of the drone type.

BACKGROUND

The document U.S. Pat. No. 6,343,767 already discloses such an optical viewing device, with a mobile orientation, to observe a field through a window being substantially dome-shaped. The field is projected on a viewing plane through the viewing device, such device comprising to this end optical conjugation means for the field with the viewing plane and relative orientation means for the viewing plane with respect to said field being observed.

More precisely, said relative orientation means are made of mobile prisms being rotated around the optical axis of the device. Thus, they allow the viewing direction to be oriented in a cone, the half-angle of which at the summit is equal to 2·(n−1)·A, A being the angle at the summit of the prisms and n the refraction index for the material of said prisms.

Such a device, also called "diasporameter", thus allows a field centred on the optical axis of said device to be observed, such viewing field being able to be reoriented with respect to said optical axis via the set of prisms so as to view a different optical field and located close to the field being centred on said optical axis. This device thus offers the possibility, via the rotating prisms, to observe a very broad optical field as well as to restore the viewing when the latter is deviated from the optical field looked at, being centred on the optical axis.

Such a device is generally used for an infinity observation and works in such a case with parallels beams. Under these conditions, the prisms are not able to degrade the optical quality of the image formed on the viewing plane, except possibly for the chromatic and dispersal aberrations.

Nevertheless, such a device has a major disadvantage bound to applications such as auto-leading guidance of a missile. Indeed, for such applications, it is indispensable that the window being located upstream from the missile path presents an aerodynamical profile and more particularly a substantially hemispherical dome shape.

The shape of such window then introduces a non nil divergence corresponding to a focal distance, for example, of −20 to −5 meters, thereby necessarily generating aberration defects, especially of the astigmatism type. In other words, due to the curvature of the window, the field focusing steps in two fields being perpendicular to each other cannot be performed each in a same viewing plane perpendicular to the optical axis of the device. The image being formed on such viewing plane as well as the viewing performance then become substantially degraded.

Furthermore, the above-mentioned relative orientation means, such as prisms, are designed for parallel beams. Now, in the present case, the beam that crossed the window is substantially divergent. Consequently, the defects generated at the window will reach the prisms and be amplified therein.

Consequently, the assembly formed by the window and the relative orientation means is the source of significant aberration defects, especially of the astigmatism type.

SUMMARY

In the above-mentioned prior document, optical correction means are provided so as to correct such defects. To do so, it is acted on the relative orientation means, a surface of each prism being distorted so as not to be plane anymore and so that such distortion can correct at least in part said defects, from a previous calculation of the surface profile based on the minimization of the aberrations estimated in terms of Zernike polynomials.

However, such a solution presents this disadvantage to need a specific treatment for each of the prisms, what is not only costly, but also difficult to be implemented.

The present device, system, and method aim at remedying such disadvantages and relates to a process to correct aberration defects within an optical viewing device for observing a field through a window with substantially a dome shape, the optical viewing device comprising optical conjugation means for the field being observed with a viewing plane and relative orientation means of the viewing plane with respect to said field, optical correction means being provided so as to correct said aberration defects, such process allowing an optical viewing device to be available being upon the operation thereof at least partly exempt from the astigmatism defects generated by the assembly formed by the window and the relative orientation means, while being of easy making and integration through current operations.

To do so, according to the present disclosure, the correction process as above-defined is remarkable in that the optical correction means are diposed between the window and the relative orientation means so that said optical correction means form together with said window an at least substantially afocal optical system.

Thus, thanks to the present device, system, and method, the astigmatism defects generated by the window and the relative orientation means can be simply corrected. Indeed, it is sufficient for this to add to the optical viewing device (or to put in front of such device) optical means provided specifically to do so, such means being located between the relative orientation means and the window so as to be arranged the closest to the window and thus to correct optically the defects immediately after their appearance, thereby avoiding their propagation and their subsequent amplification along the device, and more particularly after their propagation within the rotating prisms.

It should be noticed that according to aspects of the invention, the optical system formed by the window and the optical correction means should not necessarily be perfectly afocal. Indeed, it is inherent to this type of system that it may not be afocal for every orientation of the field being observed, so that it is important to make a compromise between focusing a field centred on the optical axis and focusing a field being out of the optical axis. So, it is thus important according to the present disclosure that such optical system can be at least substantially afocal and ideally as much as afocal possible.

Thanks to the device, system, and method again, the astigmatism correction does not induce any extra difficulty for making the optical viewing device, since these optical correction means can be of a simple design, for example a lens, and easy to be integrated into the optical viewing devices with mobile orientation of the prior art. More precisely, the shape and the position of the lens can be chosen as a function of the window so that said lens and said window form an at least substantially afocal optical system, for which the overall astigmatism is cancelled (or at least substantially reduced). In other terms, the correction means can be acquired or produced separately from the viewing device, the structure of the latter being not modified and being thus able to be standard, such correction means simply adapting to the window being arranged in front of the device.

According to another characteristic of the device, system, and method, the optical correction means are present under the shape of a lens, the power and the sign of which are respectively substantially equal and opposed to those of the window, thereby having this advantage to have correction means available, that are of easy design and integration, while insuring an efficient cancellation of the astigmatism generated by the window and the relative orientation means.

It should be noticed that the optical powers of the window and the corrective lens can not be equal, but may closely approximate one another, due to the distance between these two elements and the optical conjugation relationships between them, and due also to the fact that the optical system they form cannot be perfectly afocal for every orientation of the field being observed.

In this last case, the window being generally divergent, the lens forming the optical correction means is convergent.

The device, system, and method also relate to an optical viewing device for a field through a window with substantially the shape of a dome, comprising optical conjugation means for the field being observed with an observation plane and relative orientation means for the observation plane with respect to said field, optical correction means being provided so as to correct aberration defects within the optical viewing device. According to the device, system, and method, said optical correction means are arranged between said window and said relative orientation means so that said optical correction means form with said window an at least substantially afocal optical system.

According to another characteristic of the device, system, and method, the optical correction means are mounted on a support being integral with the device.

According to another characteristic yet of the device, system, and method, the optical correction means are mounted on a removable support.

To get a good precision of the conjugation between viewing field and observation plane, the optical conjugation means are made of a plurality of lenses arranged behind the relative orientation means.

According to another characteristic of the device, system, and method, the relative orientation means are made of two independent prisms rotationally mounted around the optical axis so that the observation direction is oriented, with respect to the field being observed, through said prisms.

BRIEF DESCRIPTION OF THE DRAWINGS

The figures of the accompanying drawing will make well understood how the device, system, and method can be implemented. On these figures, identical annotations denote similar elements.

DETAILED DESCRIPTION

Figure 1:
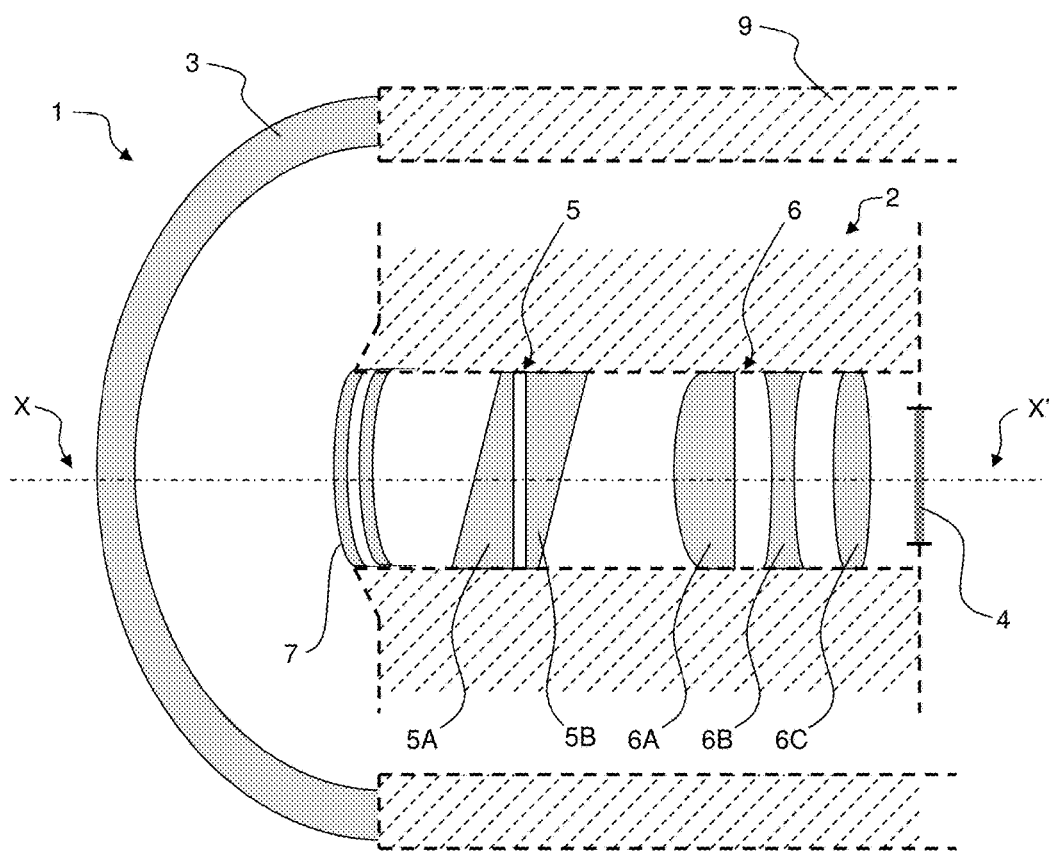
FIG. 1 is a schematic longitudinal section of a field viewing optical device according to the present disclosure.

The optical viewing device 2 of FIG. 1 comprises a set of optical means, all centered on a same optical axis X-X' forming in fact the optical axis of the device, being intended in particular for the orientation and the conjugation of a field to be observed (for example, the field 8 of FIGS. 2 and 3) with respect to a viewing plane 4.

Such device 2 is more particularly adapted for the observation of the field 8 through a window such as the window 3 of FIG. 1, in the shape of a substantially hemispherical dome. Such window, due to its bent shape, is an optically divergent element.

The viewing device 2 comprises a set of prisms 5A and 5B forming together relative orientation means 5 for the optical axis X-X' with respect to the field being observed, in order to re-orient a field initially not centered on the optical axis (for example the field 8 of FIG. 3) so that it is, after passing the prism 5A and 5B centered on the optical axis. For this, these two prisms are rotationally mounted around the optical axis X-X' of the device independently from each other, so that they can be rotated one with respect to each other to re-orient the field being observed at the level of the plane 4. Such rotations are made possible by the use of appropriate supports, which is a current practice for the man of the art.

The prisms used can be Risley prisms or Fresnel prisms, but other types of prisms can be used depending on the applications being envisaged.

In the case of chromatically dispersive elements, such as prisms, it is important to work with monochromatic light or in narrow spectral band. Upon then, a laser source can be used, which is adapted to emit laser impulsions towards a target to be observed, such laser impulsions being able to be reflected on the target to be then detected by a sensor arranged at the level of the observation plane 4, such detection being able to be operated for example with a camera being synchronized on the impulsions on the laser source.

In another embodiment, prisms are replaced by diffractive blades.

The viewing device 2 also comprises a set of lenses 6A, 6B and 6C forming together optical conjugation means 6 for the field 8 being observed with the observation plane 4. These means 6 are arranged under the form of an objective positioned so that, when the device 2 works with an object at the infinite, the image focus plane of the objective will be confused with the viewing plane 4.

According to a particular embodiment applying for example for a missile with an auto-leading guidance, the device 2 comprises an optical sensor arranged at the level of the viewing plane 4.

The so-formed device 2 allows the observation of a viewing field, for example of about 10°, with a possible field re-orientation, via the relative orientation means 5, in a range for example of about [−20°; +20°] or [−30°; +30°]. The optical viewing device 2 can then be used for applications where it is desired to observe a quite broad field.

The set of the elements making the device 2 can be integrated within a housing (partially represented on FIG. 1 by hatches), each optical element and/or each set of optical elements being arranged inside an adapted support.

The set formed by the viewing device 2 and the window 3 (itself centered on the optical axis X-X' of the device 2)—extended by a profile 9—makes a part 1 of a viewing system adapted to be integrated into two different equipment types, such as a missile (for which the window 3 shows an aerodynamic profile), a terrestrial vehicle or even a reconnaissance airplane (for example of the drone type).

As the viewing device 2 is in general made independently from the system within which it is supposed to be integrated and thus from the window 3, said device 2 is designed to focalize an object at the infinite in the viewing plane 4 without taking into account the fact that a window can possibly be arranged in front of it. It does result that the image formed by the device 2 is degraded by the astigmatism defects generated, from the one side, by the window 3 and, on the other side, by the relative orientation means 5 which amplify those defects.

According to the present device, system, and method, there are arranged in front of the different optical elements of the device 2—and in particular the relative orientation means 5—optical correction means 7 for the aberration defects generated by the set formed by the window 3 and the relative orientation means 5. More precisely, these means 7 are arranged between the window 3 and the relative orientation means 5 so that such correction means 7 form with the window 3 an at least substantially afocal optical system.

According to the embodiment of FIG. 1, such correction means are present under the shape of a lens 7, the shape and the position of which are determined as a function of these of the window 3 in order to implement the above mentioned afocal optical system. For this, the simplest realization consists in that the window 3 and the correction lens 7 present optical powers which are substantially equal in absolute value, but with opposed signs.

According other embodiments, a plurality of lenses could be used to form these means 7, even if it preferred to use only one lens for occupational reasons.

Depending on the applications, these optical correction means 7 can be integrated in different ways. They can in particular be mounted on a support:
being integral with the viewing device 2, so that they can be manufactured either together or separately, then integrated into the device depending on the window 3;
being integral with the window 3 so that said window takes profit directly of its optical correction means;
being independent both on the window 3 and the device 2; or
being removable so that said support can be made sometimes integral and sometimes independent from the device 2 or the window 3.

The arrangement of the optical correction means 7, between the window 3 and the relative orientation means 5, allows the astigmatism defects generated by this same window 3 and the relative orientation means 5, to be corrected so that said window and the means 7 being so assembled form together an at least substantially afocal optical system, although the latter are independently manufactured and integrated at different moments.

It is to be noticed here that it would be simpler and more intuitive to correct the defects generated by the window 3 and the orientation means 5 after the latter. On the contrary, the present device, system, and method consist not to correct the defects after their propagation and their amplification are established, but as soon as they appear, that is to say just after the window 3, so that such defects cannot be propagated within the relative orientation means 5 and amplified therein.

Figure 2:
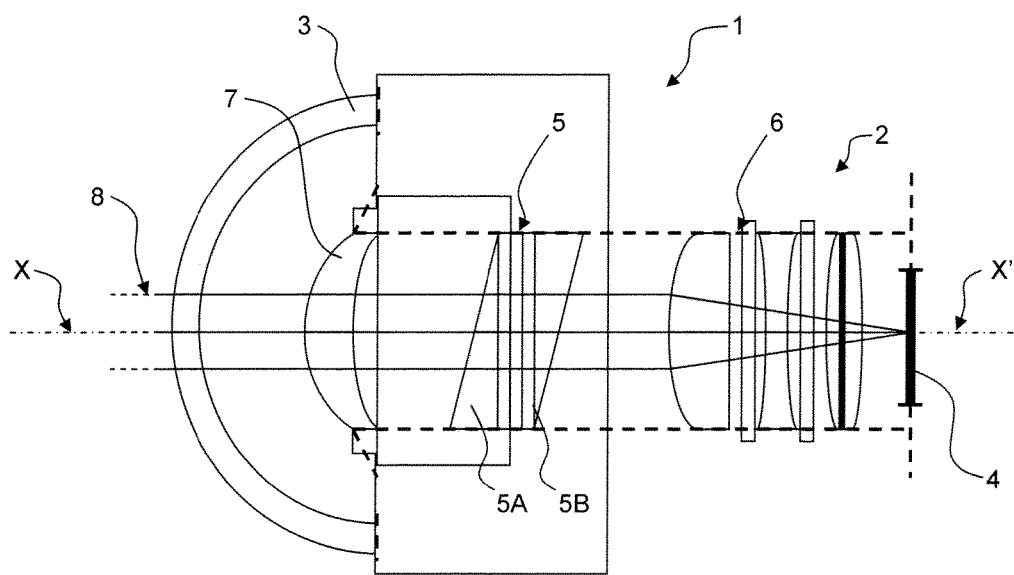
FIG. 2 is a simplified section of this same device in a viewing position for a field centred on the optical axis.
Figure 3:
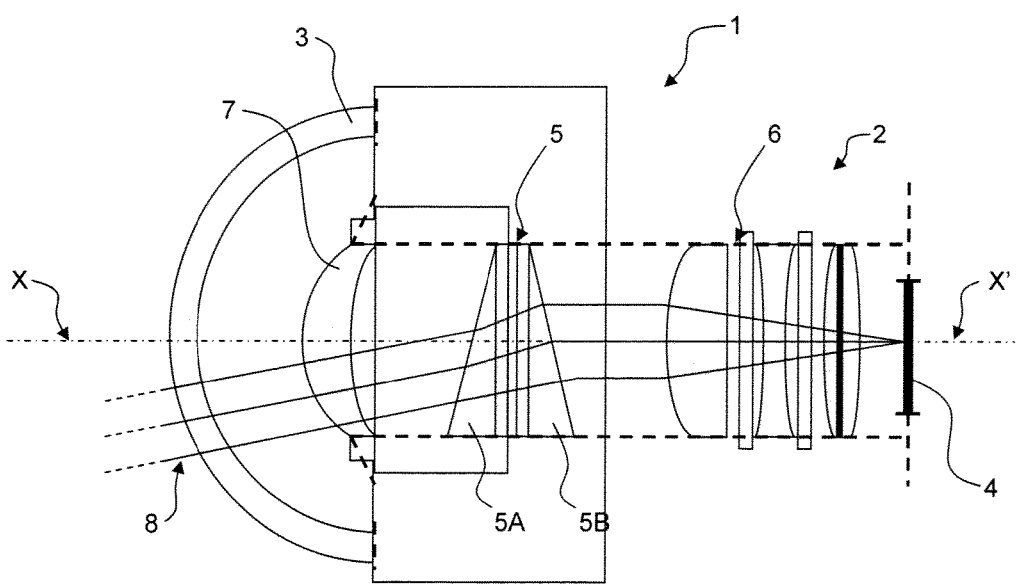
FIG. 3 is a simplified view of this same device in a viewing position for a field arranged out of the optical axis.

Referring to FIGS. 2 and 3, it is seen that the focusing of a field 8 to be observed on the optical axis is performed at the level of the observation plane 4 (FIG. 2), as well as the focusing of a field 8 being out of the optical axis (for example oriented at 30° with respect to said optical axis) is also operated substantially at the level of the viewing plane 4 (FIG. 3) and more precisely this field being out of the optical axis is brought back to the optical axis after the relative orientation means 5, the second prism 5B having been submitted to a rotation of 180° around the optical axis. The astigmatism defects being observed at the level of the plane 4, due to the arrangement of a substantially hemispherical window in front of a device 2, are thus at least in part corrected.

Thus, it is possible to design the viewing device 2 and the window 3 in an totally independent and modular way, thereby allowing to have standard elements available, only the optical correction means 7 being to be determined depending on the window 3 so that the beam crossing successively the window 3 and the means 7 is an at least substantially parallel beam. These means 7 can thus make a module being independent from the other elements of the viewing system and which is integrated into the rest of said system to correct the above mentioned aberration defects (or that can be possibly directly integrated into the window 3).

The invention claimed is:

1. A method for correcting aberration defects in an optical viewing device having a substantially dome-shaped optical window and a viewing plane, wherein the aberration defects are created by the optical window, the method comprising:
providing a prism assembly in the optical viewing device behind the optical window, the prism assembly being operable to provide a viewing field behind the optical window;
placing a corrective lens between the optical window and the prism assembly, wherein the corrective lens is configured to correct the aberration defects created by the optical window; and
providing a plurality of lenses between the prism assembly and the viewing plane to optically conjugate the viewing field provided by the prism assembly;
wherein the combination of the optical window, the corrective lens, and the prism assembly creates a substantially afocal optical system in the optical viewing device; and
wherein the corrective lens, the prism assembly, and the plurality of lenses are centered on a linear optical axis X-X' defined in the optical viewing device between the optical window and the viewing plane.

2. The method of claim 1, wherein the prism assembly comprises at least two prisms optically configured to orient the viewing field for light received through the optical window and the corrective lens.

3. The method of claim 1, further comprising placing at least two corrective lenses between the optical window and the prism assembly.

4. The method according to claim 1, wherein the corrective lens has an optical power which is substantially equal in magnitude and opposite in sign to that of the optical window.

5. The method according to claim 1, wherein the optical window and the corrective lens are respectively divergent and convergent.

6. The method according to claim 1, wherein the optical window and the corrective lens are integrally formed.

7. The method according to claim 1, further comprising providing a support for the corrective lens in the optical viewing device.

8. The method of claim 1, further comprising providing a laser as an optical source.

9. The method of claim 8, further comprising providing a sensor arranged at the level of the viewing plane behind the plurality of lenses.

10. The method of claim 9, wherein impulsions from the laser are reflected from a target and detected by the sensor arranged at the level of the observation plane.

11. The method of claim 9, wherein the sensor is an optical sensor.

12. An optical viewing device for observing a field on a viewing plane through an optical window with substantially the shape of a dome, comprising:
at least one optical conjugation lens configured for optically conjugating the field being observed on the viewing plane;
a relative orientation assembly configured for orienting the field with respect to the viewing plane; and
at least one optical correction lens configured to correct aberration defects created by the optical window within the optical viewing device;
wherein the at least one optical correction lens is arranged between the optical window and the relative orientation assembly so that the at least one optical correction lens forms, together with the optical window and the relative orientation assembly, an at least substantially afocal optical system in the optical viewing device; and
wherein the at least one optical conjugation lens, the relative orientation assembly, and the at least one optical correction lens are centered on a linear optical axis X-X' defined in the optical viewing device between the optical window and the viewing plane.

13. The optical viewing device of claim 12, wherein the at least one optical correction lens is mounted on a support that is integral with the optical viewing device.

14. The optical viewing device of claim 12, wherein the at least one optical correction lens is mounted on a removable support within the optical viewing device.

15. The optical viewing device of claim 12, wherein the at least one optical conjugation lens is located between the relative orientation assembly and the viewing plane.

16. The optical viewing device of claim 12, wherein the relative orientation assembly comprises two prisms independently rotationally mounted around the linear optical axis (X-X') of the optical viewing device so as to orient an observation direction for the viewing plane, with respect to the field being observed, through the prisms.

17. A process to correct aberration defects within an optical viewing device for observing a field through an optical window with substantially a dome shape, the process comprising:
providing optical conjugation means for the field being observed with a viewing plane in the optical viewing device;
providing relative orientation means for the viewing plane with respect to said field; and
providing an optical correction lens configured so as to correct said aberration defects;
wherein said optical correction lens is disposed between said window and said relative orientation means so that said optical correction lens forms together with said optical window and said relative orientation means, an at least substantially afocal optical system in said optical viewing device; and
wherein said optical conjugation means, said relative orientation means, and said optical correction lens along centered on a linear optical axis X-X' defined in the optical viewing device between said optical window and said viewing plane.

18. The process according to claim 17, wherein the optical correction lens has an optical power substantially equal in magnitude and opposite in sign to that of the optical window.

19. The process according to claim 18, wherein the optical window and the optical correction lens are respectively divergent and convergent.

* * * * *